United States Patent
Carlin et al.

(10) Patent No.: US 10,724,399 B2
(45) Date of Patent: Jul. 28, 2020

(54) TURBINE RING SECTOR HAVING AN ENVIRONMENTAL BARRIER DOPED WITH AN ELECTRICALLY-CONDUCTIVE ELEMENT

(71) Applicant: SAFRAN CERAMICS, Le Haillan (FR)

(72) Inventors: Maxime Carlin, Bordeaux (FR); Lisa Pin, Eysines (FR)

(73) Assignee: SAFRAN CERAMICS, Le Haillan (FR)

( * ) Notice: Subject to any disclaimer, the term of this patent is extended or adjusted under 35 U.S.C. 154(b) by 26 days.

(21) Appl. No.: 16/076,928

(22) PCT Filed: Feb. 16, 2017

(86) PCT No.: PCT/FR2017/050347
§ 371 (c)(1),
(2) Date: Aug. 9, 2018

(87) PCT Pub. No.: WO2017/140985
PCT Pub. Date: Aug. 24, 2017

(65) Prior Publication Data
US 2019/0040761 A1 Feb. 7, 2019

(30) Foreign Application Priority Data
Feb. 18, 2016 (FR) ...................................... 16 51347

(51) Int. Cl.
*F01D 11/08* (2006.01)
*F01D 25/00* (2006.01)
(Continued)

(52) U.S. Cl.
CPC .......... *F01D 25/007* (2013.01); *C04B 41/009* (2013.01); *C04B 41/5024* (2013.01);
(Continued)

(58) Field of Classification Search
CPC .... F01D 25/007; F01D 11/005; F01D 11/122; F01D 11/08; F05D 2240/11
See application file for complete search history.

(56) References Cited

U.S. PATENT DOCUMENTS

| 2006/0280952 A1 | 12/2006 | Hazel et al. | |
| 2013/0122259 A1* | 5/2013 | Lee | C23C 30/00 428/164 |
| 2014/0120308 A1* | 5/2014 | Lin | C23C 28/3215 428/137 |

FOREIGN PATENT DOCUMENTS

| EP | 2 540 994 A1 | 1/2013 | |
| EP | 2540994 A1 * | 1/2013 | ........... F01D 25/246 |
| WO | WO 2011/085376 A1 | 7/2011 | |

OTHER PUBLICATIONS

International Search Report as issued in International Patent Application No. PCT/FR2017/050347, dated May 15, 2017.

* cited by examiner

*Primary Examiner* — Eldon T Brockman
(74) *Attorney, Agent, or Firm* — Pillsbury Winthrop Shaw Pittman LLP

(57) ABSTRACT

A turbine ring sector made of ceramic matrix composite material has a portion forming an annular base with an inner face for defining the inner face of a turbine ring when the ring sector is mounted on a ring support structure and an outer face from which there extends an attachment portion for attaching the ring sector to the ring support structure, the ring sector further including inter-sector faces, each for facing a neighboring ring sector when the ring sector is mounted on the ring support structure; wherein the inter-sector faces are coated in an environmental barrier that is doped with an electrically-conductive compound and that presents at least one slot.

13 Claims, 2 Drawing Sheets

(51) Int. Cl.
*F01D 11/12* (2006.01)
*C04B 41/52* (2006.01)
*C04B 41/50* (2006.01)
*C04B 41/00* (2006.01)
*C04B 41/89* (2006.01)
*C04B 41/85* (2006.01)
*F01D 11/00* (2006.01)

(52) U.S. Cl.
CPC .............. *C04B 41/52* (2013.01); *C04B 41/85* (2013.01); *C04B 41/89* (2013.01); *F01D 11/005* (2013.01); *F01D 11/08* (2013.01); *F01D 11/122* (2013.01); *F05D 2220/321* (2013.01); *F05D 2220/323* (2013.01); *F05D 2230/12* (2013.01); *F05D 2230/60* (2013.01); *F05D 2230/90* (2013.01); *F05D 2240/10* (2013.01); *F05D 2240/11* (2013.01); *F05D 2240/55* (2013.01); *F05D 2260/95* (2013.01); *F05D 2300/20* (2013.01); *F05D 2300/222* (2013.01); *F05D 2300/224* (2013.01); *F05D 2300/5023* (2013.01); *F05D 2300/6033* (2013.01); *F05D 2300/611* (2013.01)

TURBINE RING SECTOR HAVING AN ENVIRONMENTAL BARRIER DOPED WITH AN ELECTRICALLY-CONDUCTIVE ELEMENT

CROSS-REFERENCE TO RELATED APPLICATIONS

This application is the U.S. National Stage of PCT/FR2017/050347 filed Feb. 16, 2017, which in turn claims priority to French patent application number 1651347 filed Feb. 18, 2016. The content of these applications are incorporated herein by reference in their entireties.

BACKGROUND OF THE INVENTION

The present invention relates to a turbine ring sector made of ceramic matrix composite material, to a turbine ring assembly intended in particular for use in a turbine engine, and to a method of fabricating such a ring sector.

With turbine ring assemblies made entirely out of metal, it is necessary to cool all of the elements of the assembly, and in particular the turbine ring, which is subjected to the hottest streams. Such cooling has a significant impact on the performance of the engine, since the stream used for cooling is taken from the main stream through the engine. Also, using metal for the turbine ring limits the potential for increasing temperature within the turbine, even though that would serve to improve the performance of aeroengines.

In an attempt to solve those problems, it has been envisaged to make turbine ring sectors out of ceramic matrix composite (CMC) material in order to avoid using a metal material.

CMC materials present good mechanical properties, making them suitable for constituting structural elements, and advantageously they conserve those properties at high temperatures. Using CMC materials has advantageously made it possible to reduce the cooling stream that needs to be delivered in operation, and thus to improve the performance of turbine engines. Also, the use of CMC materials serves advantageously to reduce the weight of turbine engines and to reduce the effect of expansion when hot, as encountered with metal parts.

In the operating conditions of aviation turbine engines, characterized in particular by high temperatures and an environment that is corrosive, CMC materials can become degraded. In order to protect the portions of the ring sectors that are exposed to the stream of corrosive hot air through the turbine, it is known to coat such parts with an environmental barrier (or an environmental barrier "coating" (EBC)). For example, there are known multi-layer environmental barriers of the Si/Mullite/BSAS type (where BSAS is barium and strontium aluminosilicate), or indeed those including a silicon bonding layer and a layer of a rare earth silicate (e.g. $Y_2Si_2O_7$). In known manner, environmental barriers may be deposited by thermal spraying methods, by physical vapor deposition (PVD) methods, or by depositing slurries (e.g. by dip coating or by spray coating).

In each ring sector, the faces between sectors ("inter-sector" faces) generally include slots that receive sealing tongues, serving to prevent gas leaking to the outside of the flow passage for the gas stream through the turbine. These slots, which constitute shapes that are said to be "blind", can be formed by conventional machining methods.

Nevertheless, it would be desirable to simplify forming slots in the inter-sector faces of the ring sectors.

OBJECT AND SUMMARY OF THE INVENTION

To this end, in a first aspect, the invention provides a turbine ring sector made of ceramic matrix composite material having a portion forming an annular base with an inner face for defining the inner face of a turbine ring when the ring sector is mounted on a ring support structure and an outer face from which there extends an attachment portion for attaching the ring sector to the ring support structure, the ring sector further comprising inter-sector faces, each for facing a neighboring ring sector when the ring sector is mounted on the ring support structure. In accordance with the invention, the inter-sector faces are coated in an environmental barrier that is doped with an electrically-conductive compound and that presents at least one slot.

The term "environmental barrier that is doped with an electrically-conductive compound" is used to mean that the environmental barrier comprises at least one layer doped with an electrically-conductive compound and that the content of the electrically conductive element in the layer is sufficient to make the layer electrically conductive while nevertheless being small enough to avoid significantly affecting the properties of the environmental barrier. In certain examples, the doped layer may constitute the outer layer of the environmental barrier. In a variant, the doped layer may be coated in one or more electrically-conductive layers, i.e. layers having an electrically-conductive material, e.g. a layer comprising silicon.

Doping the environmental barrier with the electrically-conductive compound imparts an electrically-conductive nature to the barrier and thus enables the slot to be formed by machining the environmental barrier by means of an electrical discharge machining method, thereby greatly the slot much simpler to form in comparison with conventional machining methods.

The slot may extend through the entire thickness of the environmental barrier, or in a variant it may extend through only a fraction of the thickness of the environmental barrier. In an example, the slot may extend solely through the thickness of the environmental barrier, but not into the underlying CMC material. The slot may also extend in a bonding layer, optionally in contact with the ceramic matrix composite material of the ring sector, or into the CMC material of the ring sector. In an embodiment, the slot may be blind in shape, i.e. not a through slot.

In an embodiment, the electrically-conductive compound may be silicon. In an embodiment, the electrically-conductive compound may be an electrically-conductive carbon compound, e.g. carbon or an electrically-conductive carbon polymer. In an embodiment, the electrically-conductive compound may be a metal compound. In an embodiment, the electrically-conductive compound may be silicon carbide (SiC).

In an embodiment, the environmental barrier further comprises at least one rare earth silicate. An example rare earth silicate may be $Y_2Si_2O_7$.

Under such circumstances, the environmental barrier may comprise a first layer comprising the rare earth silicate doped with the electrically-conductive compound, and a bonding second layer, e.g. made of silicon, situated between the first layer and the ceramic matrix composite material of the ring sector. The bonding second layer serves in particular to attach the first layer and make it possible to protect the underlying CMC material from oxidation. In general manner, it is possible to select the electrically-conductive compound so that it is compatible with the majority material forming the doped layer. Thus, it is advantageous to use silicon when the environmental barrier comprises a layer doped with a rare earth silicate since it can oxidize into silica $SiO_2$, which is compatible with the material of that layer.

In general manner, whatever the embodiment under consideration, the content by weight of the electrically-conductive compound in the layer of the environmental barrier in which the compound is present may be less than or equal to 35%, e.g. lying in the range 5% to 35%.

In an embodiment, the environmental barrier comprises at least one doped rare earth silicate layer having a content by weight of silicon that is less than or equal to 35%, e.g. lying in the range 5% to 35%. In an embodiment, the environmental barrier comprises at least one doped rare earth silicate layer having a content by weight of electrically-conductive carbon compound that is less than or equal to 35%, e.g. lying in the range 5% to 35%. In an embodiment, the environmental barrier comprises at least one doped rare earth silicate layer having a content by weight of metal compound that is less than or equal to 35%, e.g. lying in the range 5% to 35%. In an embodiment, the environmental barrier comprises at least one doped rare earth silicate layer having a content by weight of silicon carbide (SiC) that is less than or equal to 35%, e.g. lying in the range 5% to 35%.

In an embodiment, the environmental barrier comprises at least one doped barium and strontium aluminosilicate (BSAS) layer having a content by weight of silicon that is less than or equal to 35%, e.g. lying in the range 5% to 35%. In an embodiment, the environmental barrier comprises at least one doped barium and strontium aluminosilicate layer having a content by weight of electrically-conductive carbon compound that is less than or equal to 35%, e.g. lying in the range 5% to 35%. In an embodiment, the environmental barrier comprises at least one doped barium and strontium aluminosilicate layer having a content by weight of metal compound that is less than or equal to 35%, e.g. lying in the range 5% to 35%. In an embodiment, the environmental barrier comprises at least one doped barium and strontium aluminosilicate (BSAS) layer having a content by weight of silicon carbide (SiC) that is less than or equal to 35%, e.g. lying in the range 5% to 35%.

The invention also provides a turbine ring assembly comprising a ring support structure and a plurality of ring sectors forming a turbine ring, each ring sector being mounted on the ring support structure and being as defined above, at least one sealing tongue being present in the slot in the environmental barrier of each ring sector A turbine engine including a turbine ring assembly as described above also constitutes the subject matter of the present invention.

In a second aspect, the invention provides a method of fabricating a ring sector as set out above, the method comprising at least the following steps:
forming on the inter-sector faces of a ring sector an environmental barrier doped with an electrically-conductive compound; and
using electrical discharge machining to form at least one slot in the environmental barrier as formed in this way.

BRIEF DESCRIPTION OF THE DRAWINGS

Other characteristics and advantages of the invention appear from the following description of particular embodiments of the invention, given as nonlimiting examples, and with reference to the accompanying drawings, in which.

DETAILED DESCRIPTION

Figure 1:
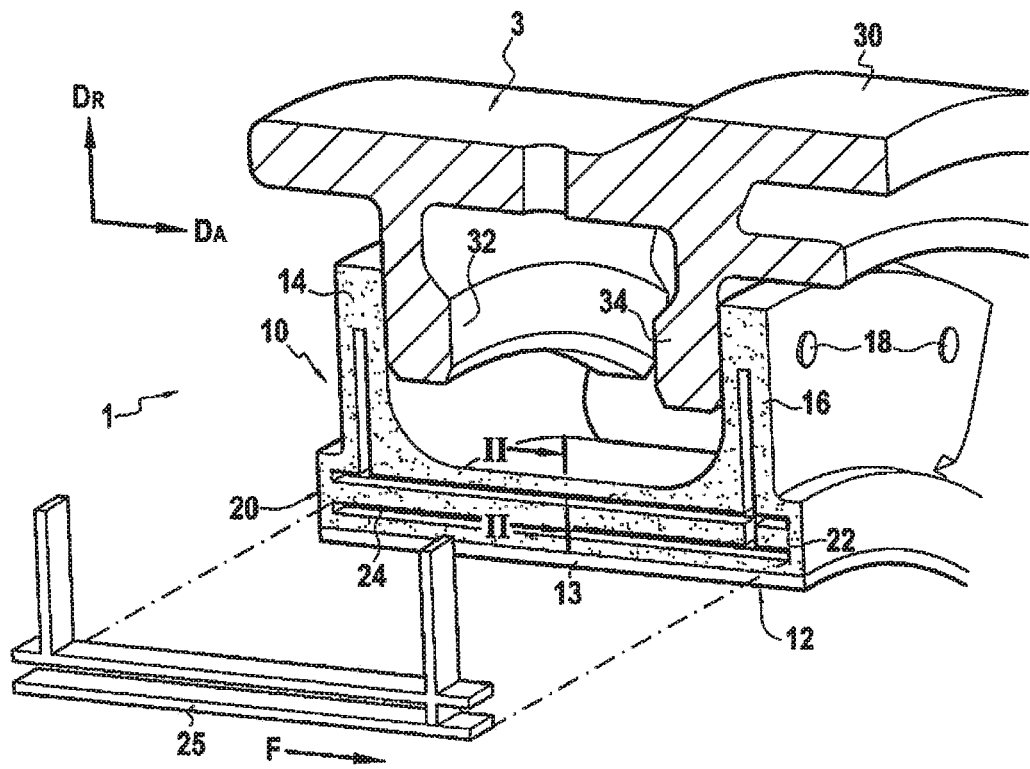
FIG. 1 shows a turbine ring sector mounted on a ring support structure.

FIG. 1 shows a high-pressure turbine ring assembly comprising a turbine ring 1 made of ceramic matrix composite (CMC) material together with a metal ring support structure 3. The turbine ring 1 surrounds a set of rotary blades (not shown). The turbine ring 1 is made up of a plurality of ring sectors 10, FIG. 1 showing only one ring sector mounted on the ring support structure 3. In the example shown, in axial section, each ring sector 10 presents a section that is in the shape of the letter π. Throughout the description, axial and radial directions (arrow DA and arrow DR) are defined relative to the axis of the turbine ring, which also corresponds to the longitudinal axis of the engine.

Each ring sector 10 presents an annular base 12 having an inner face relative to the radial direction DR and an outer face relative to the radial direction DR. Each ring sector 10 has a section that is substantially in the shape of an upside down letter π with an annular base 12 having its inner face coated in a layer 13 of abradable material and defining the flow passage for the gas stream through the turbine. Upstream and downstream tabs 14 and 16 extend from the outer face of the annular base 12 in the radial direction DR. The terms "upstream" and "downstream" are used herein relative to the flow direction of the gas stream through the turbine (arrow F).

In this example, the ring support structure 3 is secured to a turbine casing 30 and has an upstream annular radial flange 32 and a downstream annular radial flange 34. The tabs 14 and 16 of each ring sector 10 clamp onto the upstream and downstream flanges 32 and 34 of the ring support structure 3. In the example shown, pegs 18 are inserted in holes formed in the tabs 14 and 16 of each ring sector, and they serve to fasten each ring sector 10 to the ring support structure 3. For this purpose, holes (not shown in figures) may be present in the flanges 32 and 34 of the ring support structure in order to receive the pegs 18.

Each ring sector 10 has two inter-sector faces 20 that are to be located facing an inter-sector face 20 of a neighboring ring sector 10. Each inter-sector face 20 lies in a plane defined by the radial direction DR and the axial direction DA. Each inter-sector face 20 is coated in an environmental barrier 22 for the purpose of protecting the CMC material of the ring sector 20 from high temperatures and from corrosive gas in the passage. The environmental barrier 22 is provided with slots 24 or grooves that are to receive sealing tongues 25, which, when all of the ring sectors 10 are assembled together to form the turbine ring 1, serve to prevent gas from escaping between the ring sectors 10 from the flow passage for the gas stream. The slots 24 are shapes that are blind, i.e. they are not through slots.

Figure 2:
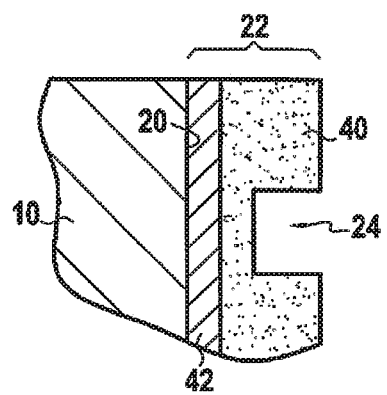
FIGS. 2 to 5 are section views of an inter-sector face of a turbine ring sector showing respective slots in various embodiments of the invention.

FIG. 2 is a section view on a radial plane showing an inter-sector face 20 of the ring sector 10, and more precisely showing it in the vicinity of a slot 24. In this example, the environmental barrier 22 is constituted by a first layer 40 that is doped with the electrically conductive compound, and by a bonding second layer 42. The bonding layer 42 is in contact directly both with the inter-sector face 20 of the ring sector 10 and also with the first layer 40. In this example, the first layer 40 is an outer layer of the environmental barrier 22, i.e. it is not covered by another layer of material. In this example, the slot 24 is made solely within the first layer 40, i.e. it does not extend into the bonding second layer 42, nor does it extend into the underlying CMC material 10.

The first layer 40 may comprise a majority by weight of rare earth silicate $RE_2Si_2O_7$, where RE designates a rare earth element, e.g. $Y_2Si_2O_7$. In a variant, the first layer 40 may comprise a majority by weight of barium and strontium aluminosilicate (BSAS). By way of example, the bonding second layer 42 may be made of silicon. The first layer 40 is doped with an electrically-conductive compound. By way of example, such an electrically-conductive compound may be silicon, silicon carbide, carbon, an electrically-conductive carbon-containing polymer, or indeed a metal compound. Because of the electrical conduction properties of the first layer 40 of the environmental barrier 22, the slot 24 may be made by electrical discharge machining in the first layer 40.

Figure 3:
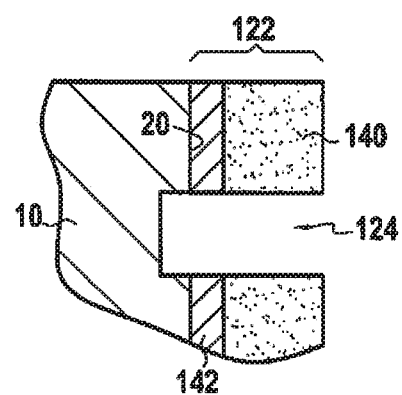

In the example of FIG. 3, the ring sector 10 is coated in an environmental barrier 122 that comprises, as above, a first layer 140 that is doped with an electrically-conductive compound and a bonding second layer 142 that is situated between the first layer 140 and the CMC material of the ring sector 10. The inter-sector face 20 also has a slot 124 that can be made by electrical discharge machining. Unlike the example of FIG. 2, the slot 124 passes right through the environmental barrier 122, i.e. both the first and the second layers 140 and 142, and it terminates in the CMC material of the ring sector 10.

Figure 4:
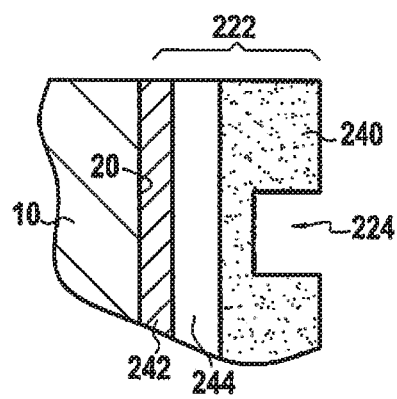

In the example of FIG. 4, the ring sector 10 is coated in an environmental barrier 222 that comprises: a first layer 240 that is doped with an electrically-conductive compound, a bonding second layer 242 that is directly in contact with the CMC material of the inter-sector face 20 of the ring sector 10, and a third layer 244 that is directly in contact with the bonding second layer 242 and with the first layer 240. The third layer 244 may comprise a material that is usually used for an environmental barrier, e.g. a rare earth silicate or a barium and strontium aluminosilicate (BSAS) as for the first layer 240, with the exception that it is not necessarily doped with an electrically-conductive compound. A slot 224 that can be made by electrical discharge machining is also present within the first layer 240, which in this example is an outer layer of the environmental barrier 222.

Figure 5:
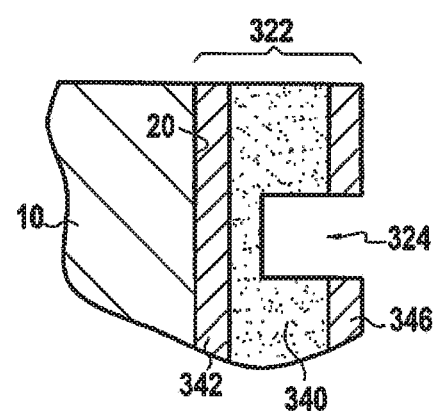

In the example of FIG. 5, the ring sector 10 is coated in an environmental barrier 322 that comprises: a first layer 340 that is doped with an electrically-conductive compound, a bonding second layer 342 that is directly in contact with the CMC material of the ring sector 10 and with the first layer 340, and a third layer 346 that is in contact with the first layer 340. The third layer 346, which in this example is the outer layer of the environmental barrier 322, has a slot 324 passing therethrough that extends into the first layer 340. In contrast, in the example shown, the slot 324 extends neither into the bonding second layer 342, nor into the CMC ring sector 10. The third layer 346 comprises an electrically-conductive compound, e.g. silicon, in order to enable the slot 324 to be made by electrical discharge machining in the environmental barrier 322.

Figure 6:
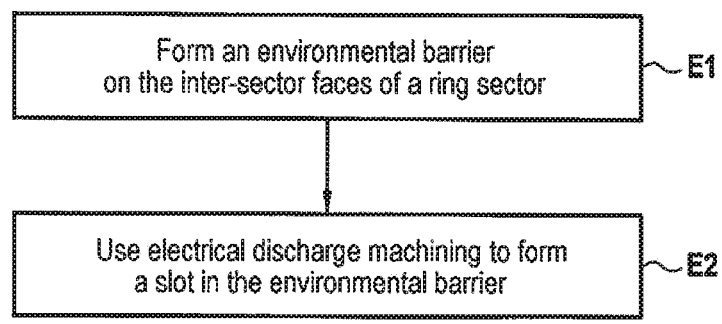
FIG. 6 is a flowchart showing the various steps of a method of fabricating a turbine ring sector in an implementation of the invention.

With reference to the flowchart of FIG. 6, there follows a description of a method of fabricating a ring sector 10 out of CMC material in accordance with the invention, and comprising inter-sector faces 20 coated in an environmental barrier 22, 122, 222, 322.

In a first step E1, it is possible to form an environmental barrier 22, 122, 222, 322 on each inter-sector face 20. To do this, it is possible to begin by depositing a bonding layer 42, 142, 242, 342 directly on the CMC material. For example, the bonding layer 42, 142, 242, 342 may be deposited in conventional manner by thermal spraying, by a liquid technique (e.g. by spray coating or by dip coating), or by physical vapor deposition. As described above, the bonding layer may be based on silicon.

Thereafter, the layer 40, 140, 340 doped with an electrically-conductive compound may be deposited directly on the bonding layer 42, 142, 342. This layer 40, 140, 340 may likewise be deposited by thermally spraying a mixture of powders comprising the majority compound of said layer together with the electrically-conductive doping compound. In a variant, it is also possible to deposit by a liquid technique using a mixture of powders in a slurry (e.g. by spray coating or by dip coating), or indeed by a physical vapor deposition. As described above, the majority compound of the layer 40, 140, 340 may be a rare earth silicate or barium and strontium aluminosilicate (BSAS), and the electrically-conductive doping compound may be silicon or carbon.

In order to obtain an environmental barrier of the kind shown in FIG. 4, it is possible, prior to depositing of the layer 240 doped with an electrically-conductive compound, to deposit a layer 244 that does not include an electrically-conductive compound, in the same manner as for the layers 40, 140, 340.

In order to obtain an environmental barrier of the kind shown in FIG. 5, it is possible, after depositing the layer 340 doped with an electrically-conductive compound, to deposit a layer 346 based on a conductive element such as silicon, e.g. by thermal spraying, by using a liquid technique, or by physical vapor deposition.

Finally, in a last step E2, it is possible to form or finalize the formation of the slot 24, 124, 224, 324 by electrical discharge machining. To do this, it is possible in known manner to immerse the inter-sector face 20 in a suitable liquid and to connect the environmental barrier 22, 122, 222, and 322 to one terminal of a voltage generator. An electrode connected to the other terminal of the same generator can then be moved over the surface of the immersed environmental barrier, and the environmental barrier can be machined by voltage pulses delivered by the generator in order to form the slot 24, 124, 224, 324.

This last step E2 is made possible by the invention because of the presence of an electrically-conductive compound as a dopant in the environmental barrier. Forming the slot by electrical discharge machining makes it possible to obtain improved accuracy for the dimensions of the slot compared with traditional machining methods, and it is easier to perform than those methods.

The invention claimed is:

1. A turbine ring sector made of ceramic matrix composite material having a portion forming an annular base with an inner face for defining the inner face of a turbine ring when the ring sector is mounted on a ring support structure and an outer face from which there extends an attachment portion for attaching the ring sector to the ring support structure, the ring sector further comprising inter-sector faces, each for facing a neighboring ring sector when the ring sector is mounted on the ring support structure; wherein the inter-sector faces are coated in an environmental barrier that is doped with an electrically-conductive compound and that presents at least one slot slot, and wherein the slot extends through only a fraction of the thickness of the environmental layer.

2. A ring sector according to claim 1, wherein the slot has a blind shape.

3. A ring sector according to claim 1, wherein the electrically-conductive compound is silicon.

4. A ring sector according to claim 1, wherein the electrically-conductive compound is an electrically-conductive carbon compound.

5. A ring sector according to claim 1, wherein the electrically-conductive compound is a metal compound.

6. A ring sector according to claim 1, wherein the electrically-conductive compound is silicon carbide.

7. A ring sector according to claim 1, wherein the environmental barrier further comprises at least one rare earth silicate.

8. A ring sector according to claim 7, wherein the environmental barrier comprises a first layer comprising the rare earth silicate doped with the electrically-conductive compound, and a bonding second layer situated between the first layer and the ceramic matrix composite material of the ring sector.

9. A ring sector according to claim 1, wherein the content by weight of electrically-conductive compound in the layer of the environmental barrier in which that compound is present lies in the range 5% to 35%.

10. A turbine ring assembly comprising a ring support structure and a plurality of ring sectors forming a turbine ring, each ring sector being mounted on the ring support structure and being as defined according to claim 1, at least one sealing tongue being present in the slot in the environmental barrier of each ring sector.

11. A turbine engine including a turbine ring assembly according to claim 10.

12. A method of fabricating a ring sector according to claim 1, the method comprising:
 forming on the inter-sector faces of a ring sector an environmental barrier doped with an electrically-conductive compound; and
 using electrical discharge machining to form at least one slot in the environmental barrier as formed in this way.

13. A turbine ring sector made of ceramic matrix composite material having a portion forming an annular base with an inner face for defining the inner face of a turbine ring when the ring sector is mounted on a ring support structure and an outer face from which there extends an attachment portion for attaching the ring sector to the ring support structure, the ring sector further comprising inter-sector faces, each for facing a neighboring ring sector when the ring sector is mounted on the ring support structure; wherein the inter-sector faces are coated in an environmental barrier that comprises a first layer doped with an electrically-conductive compound and a bonding layer arranged between the first layer and the ceramic matrix composite material of the ring sector, the environmental barrier presenting at least one slot, and wherein the slot extends through the first layer, the bonding layer and terminates in the ceramic matrix composite material of the ring sector.

* * * * *